INVENTOR
HAROLD D. CHURCH and FERDINAND JEHLE
BY R M Cooper
ATTORNEY

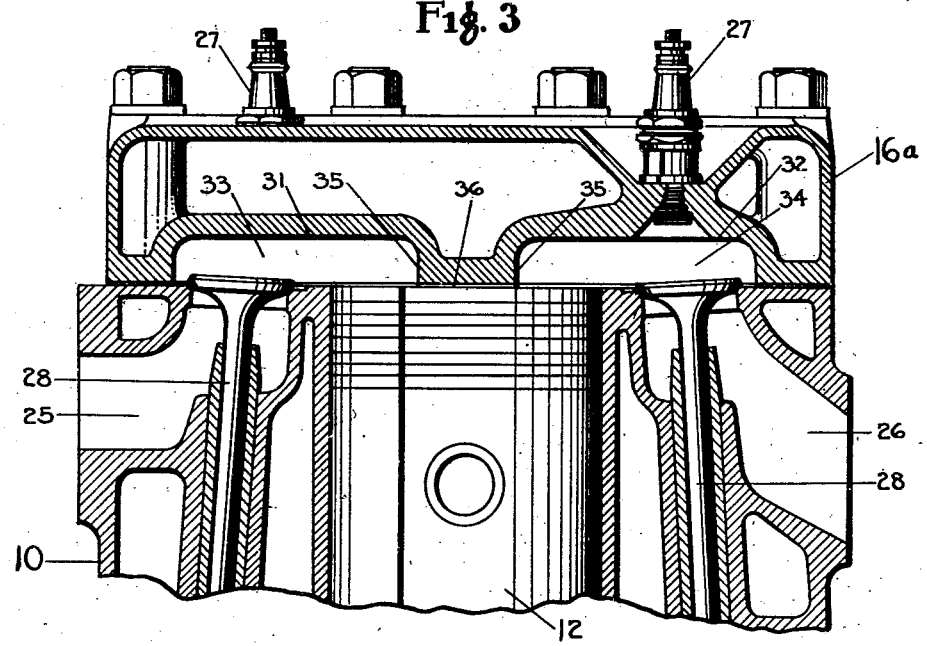
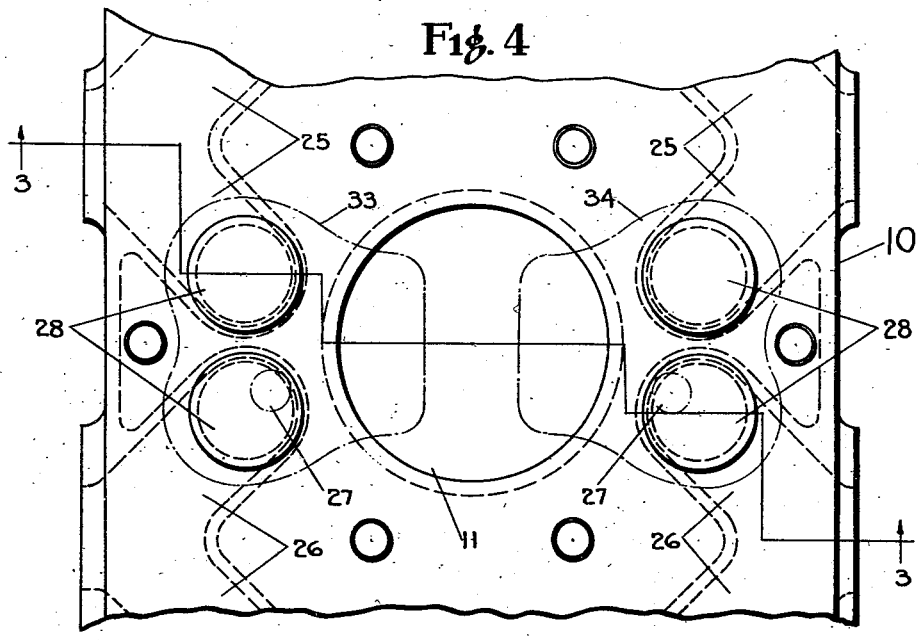

Patented Jan. 17, 1933

1,894,667

UNITED STATES PATENT OFFICE

HAROLD D. CHURCH AND FERDINAND JEHLE, OF CLEVELAND, OHIO, ASSIGNORS TO THE WHITE MOTOR COMPANY, OF CLEVELAND, OHIO, A CORPORATION OF OHIO

INTERNAL COMBUSTION ENGINE

Application filed February 4, 1930. Serial No. 425,787.

This invention relates to internal combustion engines.

It is an object of this invention to provide an engine construction which permits high compression of the fuel mixture without danger of resultant detonation during burning of the mixture.

To this end, the invention contemplates two well recognized detonation controlling features, small combustion chambers which are secured by providing a plurality of chambers for each engine cylinder, and small clearance spaces superadjacent the pistons in communication with the combustion chambers. The value of the first feature is evidenced by the fact that engines having cylinders of small diameters, and therefore small combustion chambers, can be run with very high compression without danger of detonation, the latter by the adoption by a large part of the automobile manufacturers of engine designs embodying that feature i. e., designs of the type illustrated in United States Patent 1,474,003.

In addition to the above mentioned feature, the invention contemplates a plurality of inlet passages for each engine cylinder which, by the production of diversely directed streams of fuel mixture within the cylinders during intake periods, cause high turbulence of the indrawn mixture, with a resultant decrease in the tendency of the fixture to detonate while burning.

It is a further object of this invention to provide an efficient, high compression engine construction which employs relatively small valves as compared with similar types of engine construction.

As is well known, small valves are easier to cool, less liable to warp, and subject their seats to less destructive pounding or hammering during reciprocation.

Other objects and attendant advantages will appear in the following description when read in connection with the accompanying drawings, in which—

Figure 1:
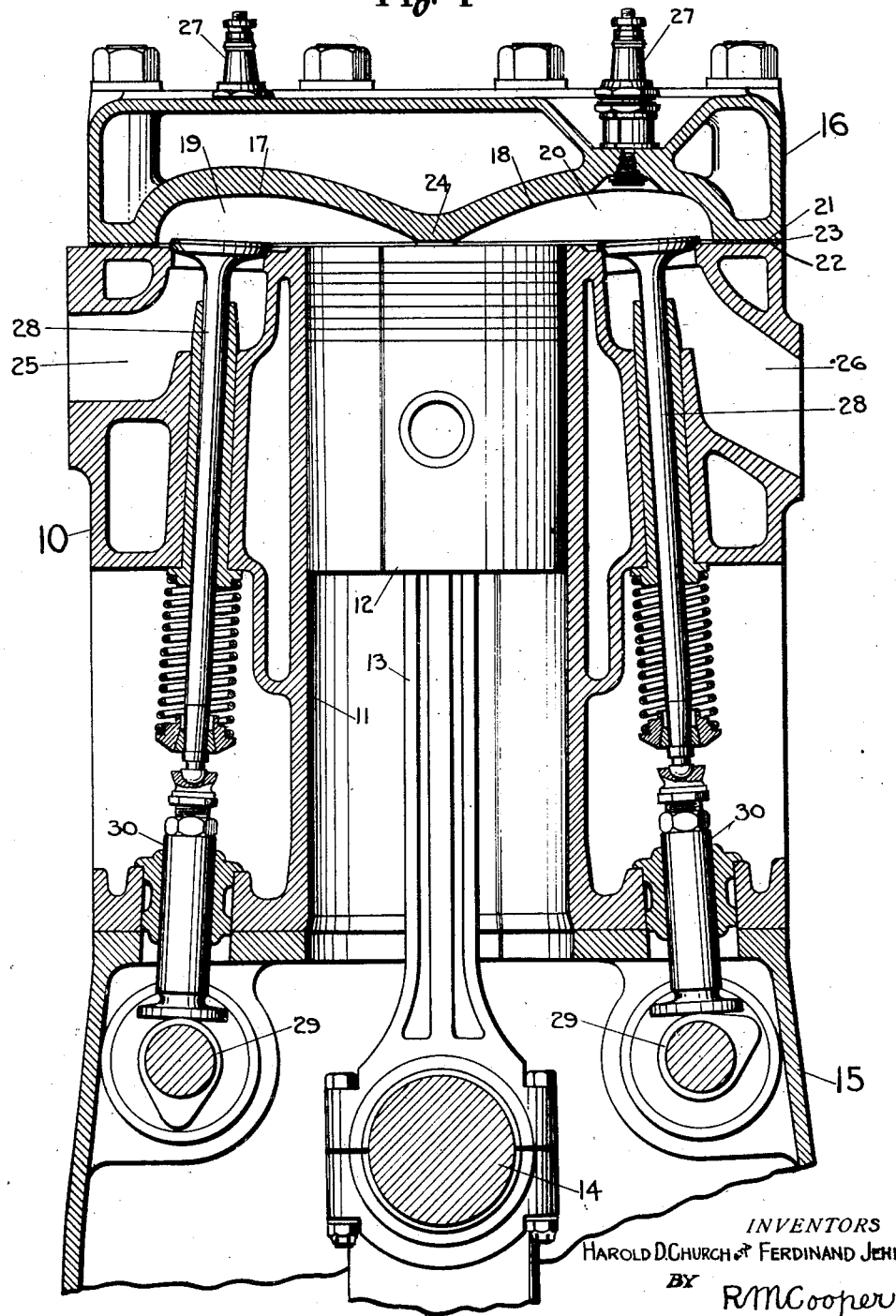
Figure 1 is a sectional view of an engine embodying this invention, the section being taken on a line corresponding with line 1—1 of Figure 2.
Figure 2:
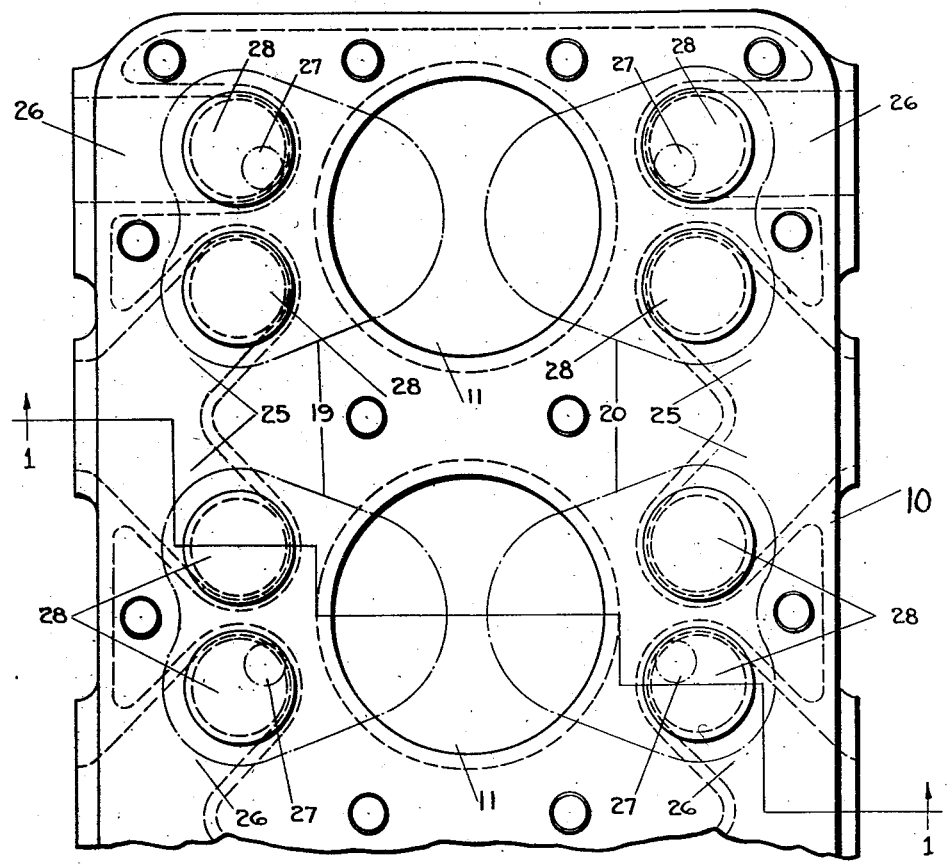
Figure 2 is a fragmentary top plan view of the cylinder block of the engine shown in Figure 1, the outlines of the superadjacent combustion chambers and spark plugs being shown in dot and dash lines which clearly illustrate their relative positions with respect to each other and to the block.
Figure 5:
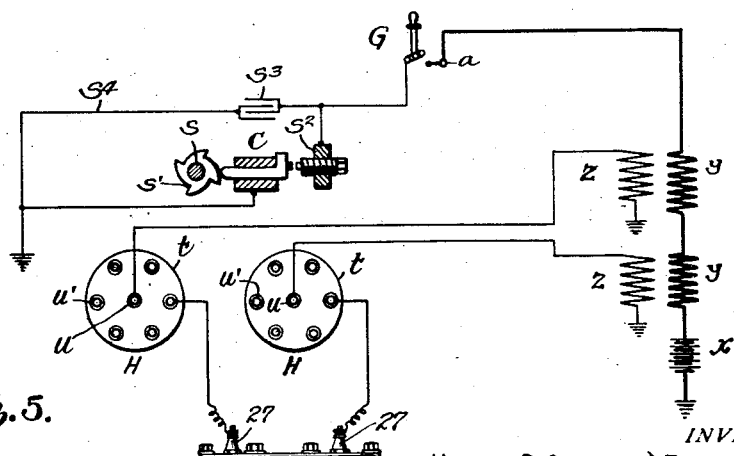

Figures 3 and 4, illustrate in analogous manner to Figures 1 and 2, a second engine embodying this invention, the section in Figure 3 being taken on a line corresponding with line 3—3 of Figure 4, and Figure 5 is a diagrammatic view of an electrical system which may be employed with the engines illustrated in Figures 1 and 2, and 3 and 4.

Referring to Figures 1 and 2, the engine therein illustrated comprises a cylinder block 10 in the cylinders 11 of which are mounted the usual pistons 12 operatively connected by means of connecting rods 13 to a crank shaft 14 journalled in the engine crank case 15.

The upper end of the cylinder block 10 is closed by a cylinder head 16 formed with two sets of longitudinally aligned recesses 17 and 18 disposed on opposite sides of the cylinders 11 in overlapping relation thereto, and forming with the upper end of the cylinder block separate pairs of combustion chambers 19 and 20 for the respective cylinders. The cylinder block 10 and the head 16 are formed with machined surfaces 21 and 22, and compressed between these surfaces there is a cylinder head gasket 23.

As clearly shown in the drawings, the chambers 19 and 20 are of equal volume, symmetrically arranged with respect to the cylinders 11, and divided by walls 24 the lower surfaces of which lie closely adjacent the upper ends of the pistons when the pistons are at the upper ends of their strokes. Each of the chambers 19 and 20 is provided with an inlet passage 25, an exhaust passage 26, and a spark plug 27. The inlet and exhaust passages 25 and 26 are formed in the block 10 subjacent the chambers 19 and 20 and are controlled by poppet valves 28 mounted in the sides of the block. They communicate at their outer ends with intake and exhaust manifolds (not shown), the inlet manifolds at the opposite side of engine being connected either with a common carburetor, or two separate carburetors, depending upon which installation produces a better distribution of the fuel mixture. The spark plugs 27 are mounted in threaded apertures formed in the head 16, and are connected with electrical apparatus designed to separately fire the cylinders of the engine in their proper order, the firing of each cylinder being effected through the production of substantially synchronous sparks between the electrodes of the spark plugs entering into the combustion chambers communicating with that cylinder.

The electrical apparatus may consist of an ignition system as disclosed in United States Patent No. 1,292,241. It is preferred, however, in the employment of such a system to eliminate the vibrator D and all mechanism accessory thereto, and to connect the switch G directly with the interrupter as illustrated in Figure 5 of the drawings wherein, with the exception of the spark plugs 27, the parts of the system are indicated by the same reference characters employed in the patent.

Mounted in the crank case 15 on opposite sides thereof, there are two cam shafts 29 driven at one half crank shaft speed, and in synchronism with each other. These shafts operate the valves 28 through the instrumentality of valve tappets 30 mounted in the upper wall of crank case intermediate the cams of the shafts 29 and the stems of the valves 28.

In operation of engine, fuel mixture is drawn into the cylinders 11 through the oppositely disposed intake passages 25, the two streams of mixture reacting with each other to cause high turbulence of the indrawn mixture. The mixture drawn into each cylinder during the intake stroke of the associated piston is compressed equally within the superadjacent chambers 19 and 20 and when ignited by synchronous sparks produced within chambers by the electrical apparatus hereinbefore referred to, produces equal pressures on opposite sides of the piston. The burned gases are ejected from the cylinder in equal proportions through the oppositely disposed exhaust passages 26, the small portion remaining at the end of the exhaust stroke of the piston being equally divided between the chambers 19 and 20.

Referring to Figures 3 and 4, in which facsimiles of the parts shown in Figures 1 and 2 are indicated by like reference numerals, the engine therein illustrated comprises a cylinder head 16a formed with recesses 31 and 32. The recesses 31 and 32 form with upper end of cylinder block 10 combustion chambers 33 and 34 of a distinctly different type than those of engine previously described. As clearly shown in the drawings, the combustion chambers 33 and 34 are formed with inner end walls 35 of substantial areas disposed at abrupt angles to the small clearances 36 which exist between the upper ends of the pistons 12 and the head 16 when the pistons are at the upper end of their strokes. This type of combustion chamber has been found, under certain conditions, to give better results than the type illustrated in Figures 1 and 2, the improved results probably accruing from the fact that the inner wall acts as a baffle on the unburned mixture which is forced from the chamber into the clearance space following ignition, and which in consequence thereof, effectively cools that portion of the mixture.

Although the foregoing description is necessarily of a detailed character in order that the invention may be completely set forth, it is to be understood that the specific terminology is not to be restrictive or confining, and that various rearrangements of parts and modifications of structural details may be resorted to without departing from the spirit or scope of this invention.

We claim as our invention:

1. In an internal combustion engine, the combination of a cylinder, a piston in said cylinder, a plurality of combustion chambers in communication with one end of said cylinder and separated by dividing structure having a surface which lies closely adjacent the end of the piston when the piston is at the end of its compression stroke, an inlet conduit and an exhaust conduit leading into each of said chambers, valves for said inlet and exhaust conduits, and means for causing substantially simultaneous ignition of the separate fuel charges which are compressed within the respective combustion chambers by said piston.

2. In an internal combustion engine, the combination of a cylinder, a piston in said cylinder, a pair of oppositely disposed combustion chambers in communication with one end of said cylinder and separated by a dividing wall having a surface which lies closely adjacent the piston when the piston is at the end of its compression stroke, an inlet conduit and an exhaust conduit for each of said chambers, valves for said inlet and exhaust conduits, and means for causing substantially simultaneous ignition of the separate fuel charges which are compressed within the respective combustion chambers by said piston.

3. In an internal combustion engine, the combination of a cylinder, a piston in said cylinder, a pair of oppositely disposed combustion chambers in communication with one end of said cylinder and separated by dividing wall having a surface which lies closely adjacent the piston when the piston is at the end of its compression stroke, an inlet conduit leading into one of said chambers, a second inlet conduit disposed opposite to said first named inlet conduit and leading into the other of said chambers, exhaust conduits leading into said chambers, valves for said inlet and exhaust conduits, and means for causing substantially simultaneous ignition of the separate fuel charges which are compressed within the respective combustion chambers by said piston.

4. In an internal combustion engine, the combination of a cylinder, a piston in said cylinder, a pair of oppositely disposed combustion chambers in communication with one end of said cylinder and separated by a dividing wall having a surface which is separated from the end of the piston by a small clearance space when the piston is at the end of its compression stroke, said chambers being formed adjacent said cylinder with end walls having substantial areas and disposed at abrupt angles to the aforesaid clearance space, an inlet conduit and an exhaust conduit leading into each of said chambers, valves for controlling said inlet and exhaust conduits, and means for causing substantially simultaneous ignition of the separate fuel charges which are compressed within the respective combustion chambers by said piston.

5. In an internal combustion engine, the combination of a cylinder, a piston in said cylinder, a plurality of combustion chambers in communication with one end of said cylinder and separated by a dividing structure having a surface which lies closely adjacent the end of the piston when the piston is at the end of its compression stroke, inlet and exhaust means leading into each of said chambers, and means for causing substantially simultaneous ignition of the separate fuel charges which are compressed within the respective combustion chambers by said piston.

In testimony whereof we hereunto affix our signatures this 28th day of January, 1930.

HAROLD D. CHURCH.
FERDINAND JEHLE.